Figure 1:
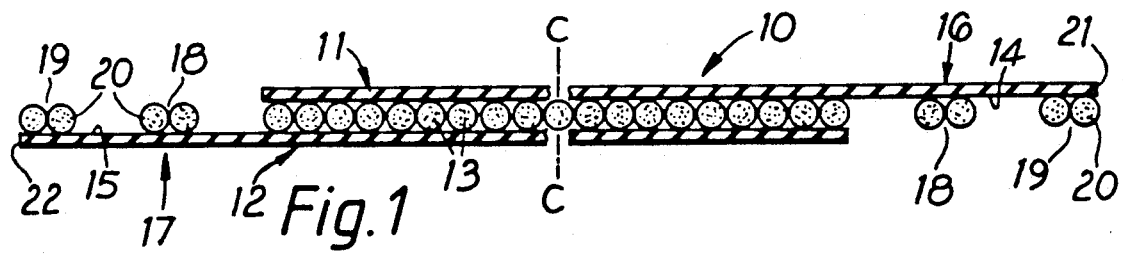

United States Patent [19]
Holroyd et al.

[11] Patent Number: 5,098,768
[45] Date of Patent: Mar. 24, 1992

[54] FLEXIBLE REINFORCED POLYMERIC MATERIAL AND A METHOD OF FORMING SUCH A MATERIAL

[75] Inventors: Eric Holroyd, Knutsford; David J. B. Perkins, Liverpool, both of England

[73] Assignee: Bridgestone/Firestone Inc., Akron, Ohio

[21] Appl. No.: 474,126

[22] PCT Filed: Nov. 14, 1988

[86] PCT No.: PCT/GB88/00981
§ 371 Date: May 1, 1990
§ 102(e) Date: May 1, 1990

[87] PCT Pub. No.: WO89/04245
PCT Pub. Date: May 18, 1989

[30] Foreign Application Priority Data

Nov. 13, 1987 [GB] United Kingdom ............... 8726625

[51] Int. Cl.⁵ .............................................. B32B 23/02
[52] U.S. Cl. ..................................... 428/192; 156/174; 156/250; 156/304.1; 264/175; 428/294
[58] Field of Search .............. 428/192, 294; 156/174, 156/250, 304.1; 264/175

[56] References Cited
U.S. PATENT DOCUMENTS 1,608,102  11/1926  Jury .

FOREIGN PATENT DOCUMENTS 1316003  12/1962  France .
1393713   5/1975  United Kingdom .
1574425   9/1980  United Kingdom .

Primary Examiner—James J. Bell
Attorney, Agent, or Firm—Sughrue, Mion, Zinn Macpeak & Seas

[57] ABSTRACT

Flexible reinforced polymeric material (30), typically a tape, comprises two elongate flexible support layers (31, 39) and a plurality of lengthwise extending cords (36) secured thereto. The respective edges of the support layers (31, 39) are transversely offset to result in a pair of edge regions and some cords (36) are sandwiched between the support layers while at least one cord (32, 33, 40) and (37, 38, 41) is secured to one of the edge regions. Preferably the two edge regions have corresponding cord arrangements (32, 33, 40) and (37, 38, 41) provided such that the cords (32, 33, 40) of one edge region may be caused to interlock with those (37, 38, 41) at the other edge region.

10 Claims, 2 Drawing Sheets

FLEXIBLE REINFORCED POLYMERIC MATERIAL AND A METHOD OF FORMING SUCH A MATERIAL

This invention relates to flexible reinforced polymeric material and in particular, although not exclusively, to flexible reinforced polymeric material for use as a rubberised ply fabric reinforcement for a flexible elastomeric article such as a pneumatic tire.

Conventionally the reinforcement of at least a part of a pneumatic tire, whether of the radial or cross-ply type, is formed from a sheet-like reinforcing ply of rubberised fabric. The ply is constructed from a woven cord fabric comprising relatively strong parallel warp cords maintained spaced apart and in parallel relationship with the aid of relatively light weft elements. The fabric is dipped to coat it with a bonding agent and then passed between the bowls of a calender at which rubber is applied over and forced between the cords to effect rubberisation of the fabric.

In constructing a pneumatic tire it is often required that the warp cords shall extend obliquely or at a right angle relative to the direction of the length of a strip of the rubberised fabric. Accordingly the intially produced rubberised fabric is cut on the bias or at 90 degrees into sections of equal length, the sections then being arranged with the original side edges of one section overlying the original side edge of a second section and the other sections being successively overlapped at their respective edges to form a strip of rubberised fabric in which the aforementioned warp cords extend obliquely or at a right angle relative to the direction of the length of the strip so formed.

The strip is wrapped around a tire building former and cut to length at a position which results in a small overlapped joint when the cut end is pressed against the former.

Although the aforedescribed method of forming part of a tire reinforcement from bias cut fabric is used extensively and is long established it suffers a number of disadvantages which themselves are also well known and understood.

Most notably the aforedescribed method undesirably results in adjacent sections of the initially produced fabric being joined by lap joints of a joint thickness therefore double that of the fabric. These lap joints will occur at random positions in the resulting tire and therefore inhibit the provision of a uniform reinforcement construction. Apart from important technical considerations this lack of uniformity undesirably mars the visual appearance of the finished tire.

Additional to the problem of overlapping, the presence of the weft elements, necessary to assist in locating the warp cords only during calendering, entails certain disadvantages as well as the cost aspect associated with the need for a weaving operation. For example, during the shaping process, in which the components applied around a tire building former are expanded to a generally toroidal shape, the spacing of the warp cords can be disturbed by the presence of the weft elements. This is a particular problem especially in the manufacture of pneumatic tires of the radial type.

Even during the calendering and pre-calendering operations, when the weft elements are needed to assist in locating warp cords relative to one another, the weft elements do not eliminate difficulties. Prior to entering the calender the unrubberised woven fabric is fed over spreader rolls which are intended to maintain a constant pitch of the cords across the width by creating tension in the weft elements. In practice the warp cords are found to bunch together at the edges of the strip and this results in undesirable non-uniformity of cord spacing especially in the regions of the respective joints between the sections forming a length of the bias cut fabric. Particularly in the case of a radial ply type pneumatic tire in which the length of a piece of rubberised ply fabric wound around the tire building former approximately equals the width of the fabric in the calender this bunching undesireably results in an area of bunched cords at one circumferential position.

Accordingly although providing some assistance with location of the warp cords when passing through the calender the weft elements do not perform any useful function in the resulting tire and cause certain disadvantages. Despite this, no satisfactory technique has yet been devised for overcoming the need to provide weft cords and/or overlapped joints of sections of rubberised fabric ply material.

In accordance with one of its aspects the present invention provides a method of forming a flexible reinforced polymeric material comprising providing a pair of elongate flexible polymeric support layers, providing a plurality of parallel warp elements secured to and supported by a support surface of at least one of said support layers to extend in the direction of the length of said at least one support layer and then arranging the support layers in an offset superimposed relationship wherein the longitudinal edges of one support layer are transversely offset relative to those of the other and with some of said warp elements sandwiched between the support layers and others secured to a transversely offset edge surface region of a support layer lying transversely beyond the corresponding edge region of the other support layer of the pair.

In accordance with another aspect of the present invention there is provided a flexible reinforced polymeric material comprising a pair of elongate flexible support layers and a plurality of parallel warp elements secured to and supported by a support surface of at least one of said support layers to extend in the direction of the length of said support layers, said support layers lying in an offset superimposed relationship wherein the longitudinal edges of one support layer are transversely offset relative to respective edges of the other support layer and with some of said warp elements lying sandwiched between the support layers and others secured to a transversely offset edge region of a support layer surface lying transversely beyond the corresponding edge region of the other support layer of the pair.

The present invention therefore provides that the flexible reinforced polymeric material shall have a pair of superimposed support layers each of which has a surface a part of which confronts a part of a confronting surface of the other support layer.

In the case of support layers of substantially equal width each of said surfaces will have an elongate edge region which does not directly confront the other strip because of the transversely offset relative disposition of the edges of the strips.

If alternatively the support layers are of different widths one of the layers, the narrower, may be arranged with each of its edges lying inwards of the two edges of the other layer. In this case the wider layer will define two transversely offset edge regions and the narrower layer will be devoid of any such edge region. It is preferred that each of said edge regions supports at least one warp element and it is further preferred that at least one of said edge regions is provided with a warp element spaced from a neighbouring warp element by a distance sufficient to allow at least one other warp element to be accommodated therebetween. Preferably the two edge regions have identical arrangements of warp elements, the warp elements of a strip of the flexible reinforced polymeric material therefore lying in a symmetrical arrangement either side of the centre line of the strip, and more preferably that symmetrical arrangement is one in which the warp element(s) at one edge region of a strip may be caused to interlock, as herein defined, with the warp element(s) at the other edge region of the strip when two edges of one or more lengthwise sections of the material of the present invention are arranged in a side-by-side manner.

By "interlock" there is meant herein an arrangement of warp elements in which, when two edges of one or more lengthwise sections of material are positioned in a side-by-side manner, a warp element of one edge region lies further inwards of the edge of the other edge region than a warp element of said other edge region. In consequence the two edge regions will resist being pulled apart in the general plane of the material.

It is to be understood that it is not essential that each edge region be provided with a warp element or that that warp element be spaced from another warp element. Two edges of one or more lengthwise sections of the material of the present invention do not necessarily require to feature an ability to be joinable directly to one another in an overlapping manner which preserves uniform thickness. Thus two edges of one or more lengthwise sections of material may be joinable by an intermediate section of jointing material which may or may not be a material in accordance with the present invention.

The warp element may be in the form of monofilaments, or groups of filaments which may be twisted together to form yarn or cord type warp elements. The elements may be of textile material or a metallic material such as brass-coated steel wire.

Preferably the warp elements lying between directly confronting portions of the confronting surfaces of the support layers are arranged at a uniform pitch. More preferably the material is devoid of weft elements and the warp elements are at touch pitch.

Figure 2:
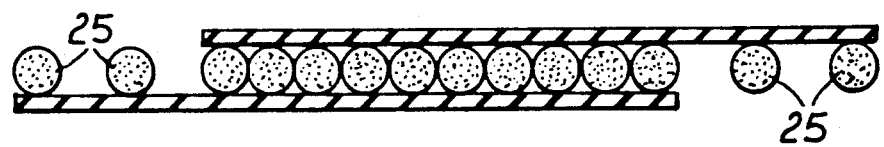
Figure 3:
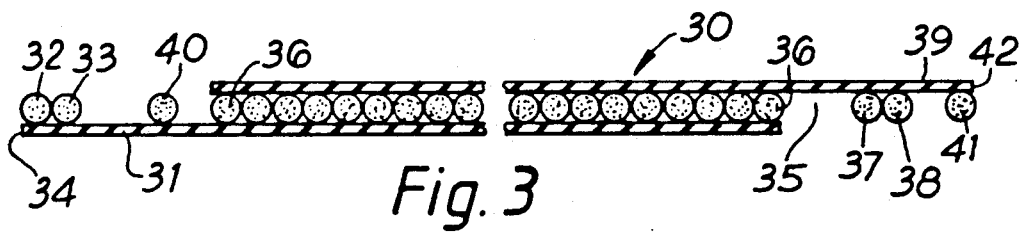
Figure 4:
Figure 5:
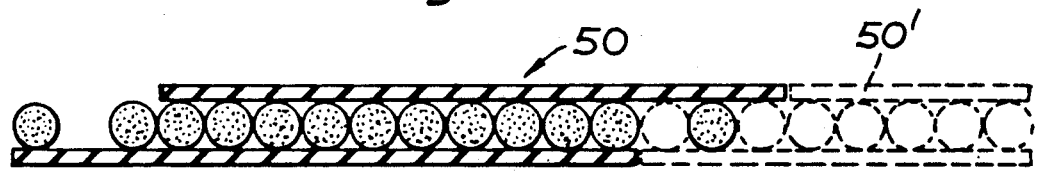
Figure 6:
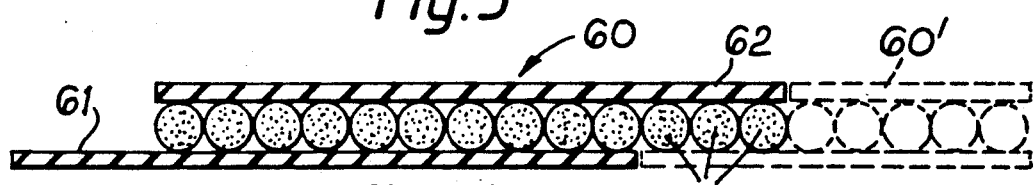
Figure 7:
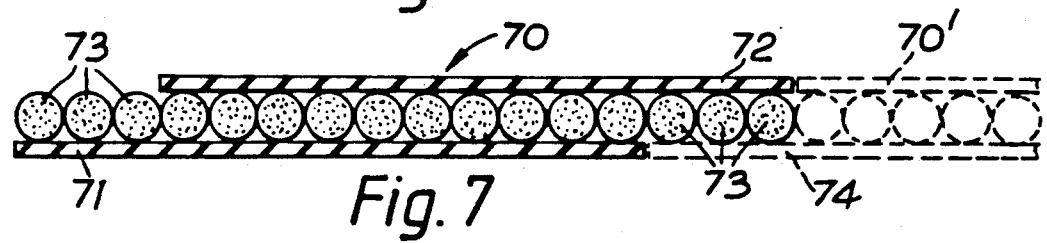
Figure 8:
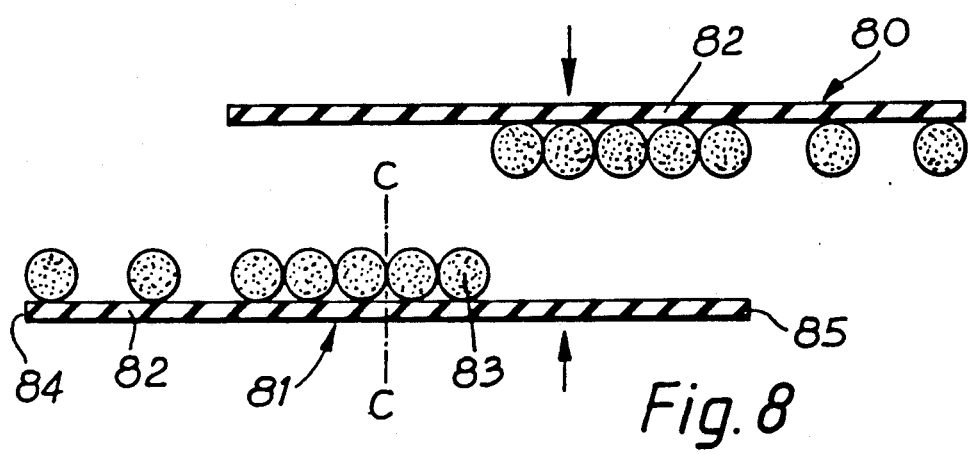
Figure 9:
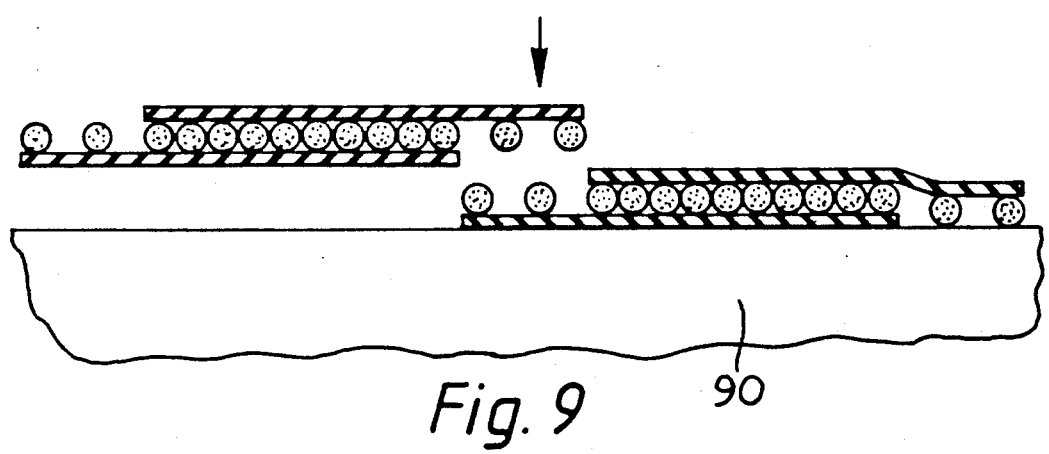
Figure 10:
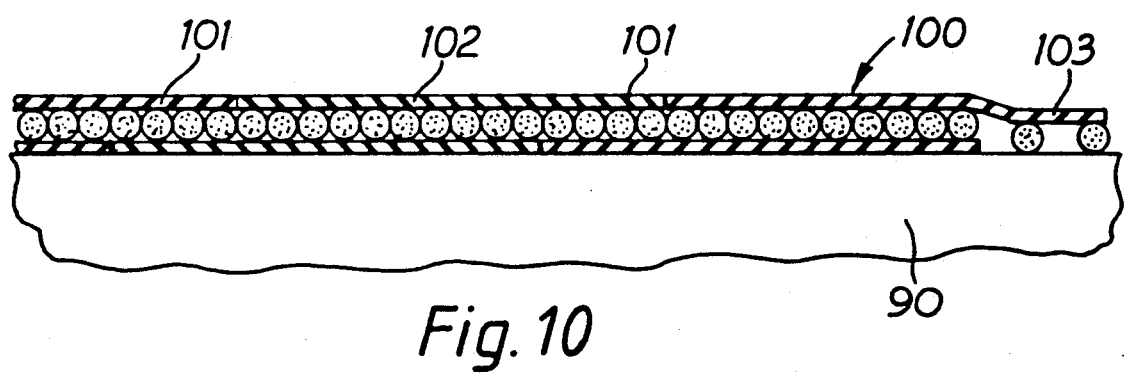
Figure 11:
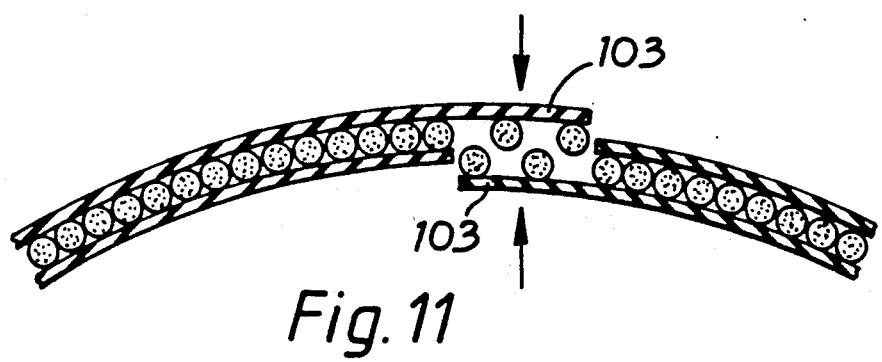

Embodiments of the invention will now be described, by way of example only, with reference to the accompanying diagrammatic drawings, in which:

FIGS. 1–7 each show in transverse section a strip of flexible reinforced polymeric material in accordance with the present invention, FIGS. 5–7 showing also the manner in which a pair of edge regions may interengage, FIG. 8 shows a method of forming a strip of the material of FIG. 2, FIGS. 9 and 10 show use of the strip of FIG. 2 to form a sheet of bias cut material, and FIG. 11 shows use of a sheet of bias cut material to form a reinforcement ply of a pneumatic tire.

A flexible reinforced rubber strip 10 (see FIG. 1) in accordance with the present invention comprises two superimposed support layers in the form of rubber strips 11, 12 maintained interconnected but spaced apart by an interposed layer of warp cords 13 arranged at touch pitch and each adhered to each of the respective inward facing surfaces 14, 15 of the two strips.

The two strips 11, 12 are transversely offset as apparent from FIG. 1 and have edge regions 16, 17 at which the surfaces 14, 15 do not directly confront one another. Each edge region serves as a support for adhesion thereto of two transversely spaced pairs 18, 19 of warp cords 20. One pair 19 lies adjacent an edge 21, 22 of a strip whilst the other pair 18 is spaced between said pair 19 and the nearest of the interposed warp cords 13. The offset is selected such that the spacing of the pair 18 from neighbouring warp cords at each side corresponds with the transverse dimensions of two of the warp cords. Accordingly the warp cords 13, 20 are disposed symmetrically each side of the centre line C—C of the reinforced strip 10.

In consequence of the positioning of the warp cords 20 at the edge regions 16, 17, if two edge regions of one or more sections are aligned there results an overlapped-type joint the thickness of which corresponds with the general thickness of the reinforced strip 10. The joint will also be of an interlocked type in that the disposition of the spaced pairs 18, 19 of warp cords 20 results at the joint in an interengagement which inherently resists separation in the general plane of the joint, i.e. in the transverse direction of the offset of the rubber support layer strips 11, 12.

Instead of providing the warp cords in pairs in the edge regions, each edge region may have adhered thereto only two transversely spaced warp cords 25 as shown in FIG. 2.

In FIGS. 1 and 2 the cords are symmetrically disposed about the centre of the reinforced strip. This is useful in that a satisfactory side-by-side joint of two portions of the strip may be made even though one portion has been inverted. However it is not an essential feature.

FIG. 3 shows a reinforced strip 30 in which the above referred to symmetry is lacking. The left-hand edge region 31 carries a pair of warp cords 32, 33 adjacent the edge 34 and in a joint these lie in the space 35 between an interposed warp cord 36 and a pair of warp cords 37, 38 carried by the right-hand edge region 39. The left-hand edge region also carries a single cord 40 which in a joint lies between the cords 37, 38 and a single warp cord 41 provided adjacent the edge 42. In a joint the cords 37, 38 lie in the space between the pair of cords 32, 33 and the cord 40 whilst the cord 41 lies between the cord 50 and the neighbouring interposed warp cord 36.

A further variation of the non-symmetrical construction of FIG. 3 is shown by the strip 45 of FIG. 4 and a more elementary form is shown in FIG. 5. FIG. 5 shows in dotted lines part of a second portion 50' of the reinforced strip 50 to illustrate the manner in which two edge regions lie together when their cords are interlocked.

It is not necessary for both edge regions to support warp elements and FIG. 6 shows an embodiment in which a reinforced strip 60 has one edge region 61 bereft of warp cords whilst the other edge region 62 is fully occupied by three cords 63 arranged at touch pitch. The manner in which a joint is obtained is made clear by the portion of another reinforced strip 60' shown in dotted lines. In this embodiment of the invention there is no interlock of warp cords at a joint.

In FIG. 7 there is shown an embodiment of a reinforced strip material 70 the edge regions 71, 72 of which cannot be joined directly without creating an overlapped joint the thickness of which is greater than the general thickness of the strip material. Each edge region carries three warp cords 73 arranged at touch pitch. To effect a joint between two edge regions use is made of a jointing strip 70' a part of which is shown, in dotted lines, in FIG. 7. The jointing strip 70' is constructed generally in the same manner as the reinforced strip except that each edge region 74 of the jointing strip is bereft of warp cords. The jointing strip in this instance therefore is not a reinforced strip of a type in accordance with the present invention.

One embodiment of the invention for forming a strip of flexible reinforced polymeric material and for forming said strip into a sheet will now be described with reference to FIGS. 8 to 10.

In a first stage of the method two similar support tapes 80, 81 are each formed by extruding a rubber strip 82 and adhering warp cords 83 thereto. The cords are arranged selectively spaced as viewed in transverse cross-section. As shown in FIG. 8 from the left-hand edge 84 of the tape 81 to the centre line C—C of that tape there is a cord, a cord space, a cord, a cord space, then three adjacent cords. From the centre line to the right-hand edge there are two adjacent cords and then five cord spaces.

The tapes 80 and 81 may be formed by cutting into two pieces a single length of tape and then inverting one of the pieces. The tapes 80 and 81 are then calendered together thereby forming a strip of flexible reinforced polymeric material in accordance with the present invention and as earlier described with reference to FIG. 2. During calendering the support tapes 80, 81 are maintained transversely offset whereby, in a central region of the strip at which the tapes are directly superimposed, ten warp cords lie in side-by-side parallel relationship at touch pitch.

In consequence of the transverse offset of the tapes 80 and 81 the resulting strip has edge regions which comprise only a single layer of the rubber strip and, in this embodiment, only two warp cords spaced one from another and from the warp cords in the central region.

To form a sheet of flexible reinforced polymeric material of a width greater than that of the strip of FIG. 2 a length of the strip is helically wound around a mandrel 90 (see FIGS. 9 and 10) in a carefully controlled manner such that the rubber strip material at one edge region overlaps that at the other region and such that the warp cords of the edge regions interlock. In consequence, as can be seen from FIG. 10, there is formed around the mandrel a tubular layer 100 having a helical joint region 101 the thickness if which equals that of the central region 102 of the strip. The tubular layer is then cut in the direction of the length of the mandrel (either parallel with the length of the mandrel or helically) to result in a relatively wide sheet of said flexible reinforced polymeric material. The sheet will have non-overlapped edge regions one of which 103 is shown in FIG. 10.

If it is desired that the warp cords extend at a more significant helical angle relative to the axis of the mandrel two strips 100 may be wound simultaneously in the manner of a twin-start helical thread.

The sheet material so produced is suitable for use for example as a ply reinforcement in the manufacture of a radial or cross-ply pneumatic tire. In the manufacture of a pneumatic tire of the radial type the sheet material may be formed on the mandrel 90 with a width related to the circumference of a tire building former. The sheet may then be applied around the former with the sheet material curved about an axis perpendicular to the axis of curvature which it had when on the mandrel, i.e. cords which extended generally circumferentially around the mandrel 90 will lie generally parallel with the longitudinal axis of the former. Thus the non-overlapped edge regions 103 lying at the sides of the strip when on the mandrel will be alignable and their cords interlockable when applied around the former as apparent from FIG. 11 which shows the curvature of the material when supported by a former (not shown). By careful control of the width and length of the strip material wound around the mandrel it is possible to obtain a sheet of material which, when applied around the former, results in an accurate interlocking of the warp cords of the edge regions.

The technique described above with reference to FIGS. 9 and 10 is suitable for purposes other than forming a ply fabric sheet for use in the manufacture of a pneumatic tire. For example, helically wound and interlocked strip material may be removed from the mandrel without cutting to produce a reinforced tubular component which may be utilised in a reinforced flexible article of polymeric material.

We claim:

1. A flexible reinforced polymeric material comprising a pair of elongate flexible support layers and a plurality of parallel warp elements secured to and supported by support surfaces of said support layers to extend in the direction of the length of said support layers, said support layers lying in an offset superimposed relationship, the longitudinal edges of one support layer being transversely offset relative to respective edges of the other support layer thereby to define a pair of edge regions at each of which a support layer surface of one support layer lies transversely beyond the corresponding edge region of the support layer surface of the other support layer of the pair, some of said warp elements lying sandwiched between the support layers and each said edge region having at least one other warp element secured thereto, a warp element at each edge region being arranged spaced from a neighbouring warp element, the two edge regions having identical arrangements of warp elements and the arrangement being such that the warp element(s) at one edge region may be caused to interlock with the warp element(s) at the other edge region.

2. A flexible reinforced polymeric material comprising a pair of elongate flexible support layers and a plurality of parallel warp elements secured to and supported by a support surface of at least one of said support layers to extend in the direction of the length of said support layers, said support layers lying in an offset superimposed relationship, the longitudinal edges of one support layer being transversely offset relative to respective edges of the other support layer and with some of said warp elements lying sandwiched between the support layers and others secured to a transversely offset edge region of a support layer surface lying transversely beyond the corresponding edge regions of the other support layer of the pair.

3. A material as claimed in claim 2, wherein each edge region supports at least one warp element.

4. A material as claimed in claim 2, wherein a transversely offset surface region of a support layer has secured thereto a warp element at a position spaced from a neighbouring warp element whereby another warp element may be positioned between said neighbouring elements.

5. A material as claimed in claim 2, wherein the two edge regions have identical arrangements of warp elements.

6. A material as claimed in claim 5, wherein the arrangement of the warp elements is such that warp elements at one edge region may be caused to interlock with the warp elements at the other edge region.

7. A material as claimed in claim 2, wherein the warp elements are at touch pitch in a central region at which the elements are sandwiched between the support layers.

8. A method of forming a flexible reinforced polymeric material comprising providing a pair of elongate flexible polymeric support layers, providing a plurality of parallel warp elements secured to and supported by a support surface of at least one of said support layers to extend in the direction of the length of said at least one support layer and then arranging the support layers in an offset superimposed relationship wherein the longitudinal edges of one support layer are transversely offset relative to those of the other and with some of said warp elements sandwiched between the support layers and others secured to a transversely offset edge surface region of a support layer lying transversely beyond the corresponding edge region of the other support layer of the pair.

9. A method as claimed in claim 8, wherein said support layers are brought together in an offset superimposed relationship by a calendering operation.

10. A method as claimed in claim 8, wherein a strip of said material is wound helically around a mandrel to cause the edge regions to interengage, and then cutting the tube of material so formed from one end to the other to produce a sheet of said material.

* * * * *